A. Hubbell.
Hulling Grain.
N° 75761 Patented Mar. 24, 1868.
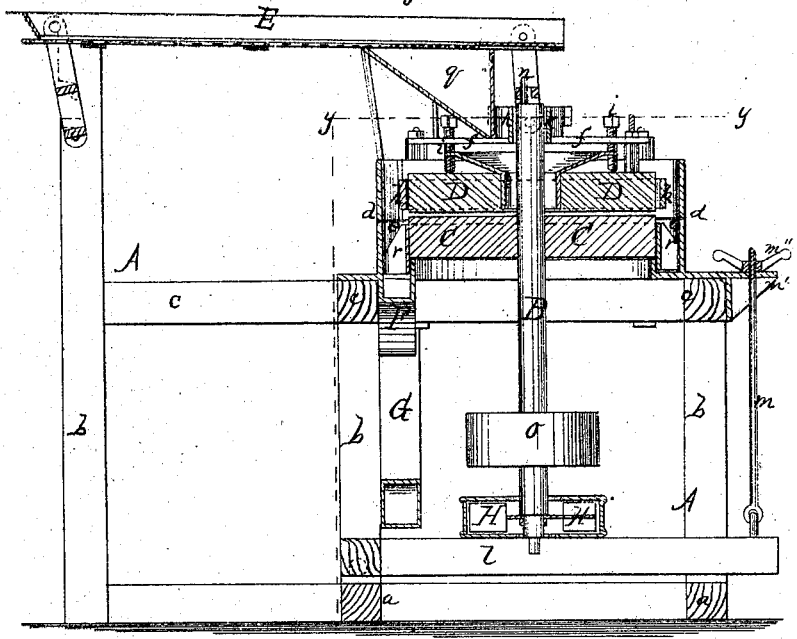
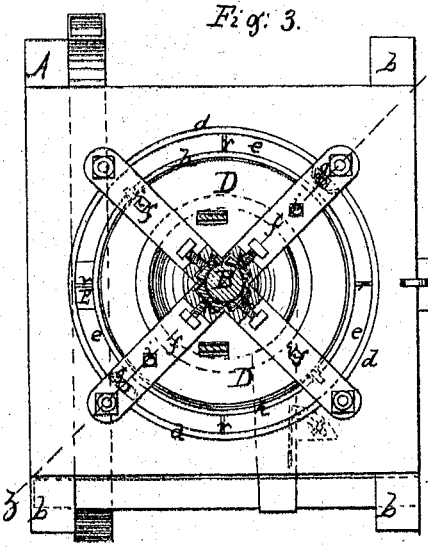
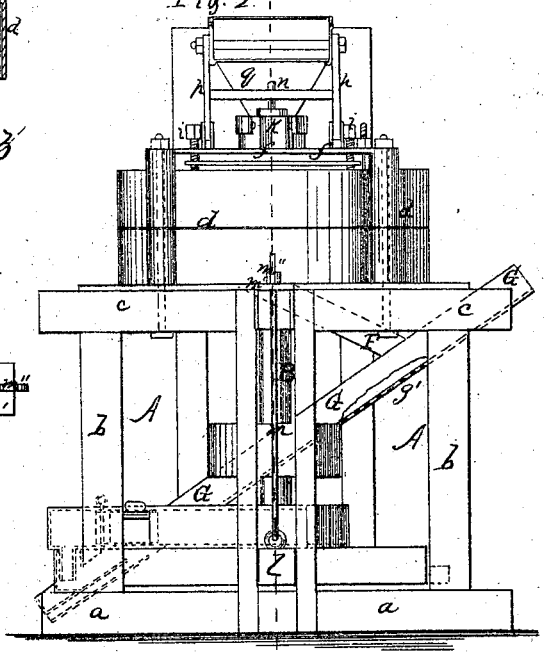
Witnesses
J. A. Leroil
Alex T. Roberts
Inventor
A. Hubbel
by Munn & Co
Attorneys

United States Patent Office.

ABIJAH HUBBELL, OF SHARON, CONNECTICUT, ASSIGNOR TO HIMSELF, E. P. H. CAPRON, OF SPRINGFIELD, OHIO, AND GEORGE V. CAPRON, OF SHARON, CONNECTICUT.

*Letters Patent No. 75,761, dated March 24, 1868.*

---

IMPROVED MACHINE FOR HULLING GRAIN.

---

The Schedule referred to in these Letters Patent and making part of the same.

---

TO ALL WHOM IT MAY CONCERN:

Be it known that I, ABIJAH HUBBELL, of Sharon, in the county of Litchfield, and State of Connecticut, have invented a new and improved Machine for Hulling Grain; and I do hereby declare that the following is a full, clear, and exact description thereof, which will enable others skilled in the art to make and use the same, reference being had to the accompanying drawings, forming part of this specification.

The object of this invention is to provide a machine, whereby all kinds of grain, but especially buckwheat, may be effectually hulled and scoured, so that the outer unwholesome hull may thereby be completely removed, leaving only the nutritious inner portion of the grain. The flour made from grain thus cleaned is brilliant and perfectly white, and far superior to that made in the usual manner.

The invention consists in the use of two burr-millstones, which are so arranged that they can be easily set true. They are set far enough apart that the grain between them is nicely shelled without being crushed. The grain is then cleaned in a fan-arrangement, or in any other suitable device. In the annexed drawing my invention is illustrated—

Figure 1 being a vertical longitudinal section of my improved machine for cleaning grain, the plane of section being indicated by the line $x\, x$, fig. 2.

Figure 2 is a front elevation of the same.

Figure 3 is a horizontal sectional view of the same, the plane of section being indicated by the line $y\, y$, fig. 1.

Figure 4 is a detail vertical sectional view, the plane of section being indicated by the line $z\, z$, fig. 3.

Similar letters of reference indicate like parts.

A represents a frame, made of wood or other suitable material, and consisting of sleepers or bed-timbers $a$, uprights, $b\, b$, and braces, $c\, c$, as shown in the drawings. In the same are arranged suitable boxes for the vertical shaft B to run in. A wheel, C, is mounted on the shaft B, so as to revolve with it. This wheel I prefer to make of solid French burr-millstone. Around the wheel C, and some distance from its circumference, is secured, upon the frame A, a metal ring, $d$, which is considerably higher than the stone, C, so as to form a circular channel, $e$, around C, as shown in figs. 1 and 3. The ring $d$ is partly covered by straps, $f$, in which are arranged two bolts, $g$, opposite to each other, to the lower ends of which a ring, $h$, is pivoted, as shown in fig. 4, so as to swing freely on its pivots. Within the ring $h$ is pivoted the upper annular stone, D, so as to swing free on its pivots. By this manner of hanging it, the stone, D, may be easily adjusted and steadied by lowering four (more or less) screws $i$, which are arranged in the straps $f$, as shown. The upper bearings K, for the shaft B, are also secured stationary on the straps $f$, as shown, in such a manner as to allow the shaft to slide up and down therein.

The lower end of the shaft B rests upon a step arranged on a bar, $l$, which is pivoted to the frame A, and is adjustable up and down on its pivot, so that the stone, C, may be brought closer to or further from the stone, D, and be held in any desired position by a screw, $m$, passing up through a plate, $m'$, as shown.

Before beginning to operate, the lower stone is brought up against the upper one, and the latter then steadied by lowering the screws $i$. The stones are then ground together, pouring water in between them until they are completely true. The stone, C, is then lowered the required distance, and the stone, D, made flexible by raising the screws $i$, and the operation of cleaning may then be begun.

To the top of the shaft B is attached a vertical pin, $n$, eccentric with the shaft. This passes through a slot in a hinged shaker, E, or in a cross-bar secured to the same, and as the shaft B is revolved by means of a belt passing around a pulley, $o$, or otherwise, the required shaking motion is imparted to the screw E, which is hinged at its upper end to the frame A, at its lower end to uprights $p$, which are secured by hinges to the cover $f$ of the ring $d$, as shown. The bottom of the screen E is perforated with very fine holes to separate the dust from the grain. At its lower end are coarser holes, through which the grain drops into a hopper, $q$, arranged above the annular channel in the stone, D, as shown, and thence the grain is brought between the stones and is hulled. By centrifugal motion, it is brought to the rim of the stone, D, and drops into the channel $e$. To the periphery of the stone, C, are secured plates $r$, which sweep the channel $e$ as the stone revolves, and whereby all the grain-hulls, &c., are brought into a tube, F, and drop thence into a large inclined tube, G, which is open on top.

A strong current of air is forced into the tube G, by means of a fan, H, on shaft B, and the light hulls, dust, &c., are thrown out at the upper end of G, the dust, which is too heavy to be raised by the air, falling through the perforated parts $g'$ of tube G, fig. 2. The heavier grain escapes through a gate at the lower end of tube G, and will then be well cleaned and freed from the hulls, whereby the value of the flour made from this grain is greatly increased without increasing its cost considerably.

What I claim as new, and desire to secure by Letters Patent, is—

The construction and arrangement upon the straps $f$ of the bearings K for the shaft B, and the adjusting screws $i$ for trimming the stone, D, as herein set forth, for the purpose specified.

ABIJAH HUBBELL.

Witnesses:
    E. N. HARTWELL,
    T. N. LUCAS.